Jan. 15, 1963     H. K. HAZEL     3,073,946

PERCUSSION WELDER

Filed Dec. 29, 1960

INVENTOR
H. KEN HAZEL

BY J T Comfort
ATTORNEY

United States Patent Office 3,073,946
Patented Jan. 15, 1963

3,073,946
PERCUSSION WELDER
Herbert Ken Hazel, Lake Katrine, N.Y., assignor to International Business Machines Corporation, New York, N.Y., a corporation of New York
Filed Dec. 29, 1960, Ser. No. 79,279
3 Claims. (Cl. 219—95)

This invention is related to apparatus for welding and more particularly to apparatus for percussion welding.

Percussion welding is widely used for welding electrically conductive wires to terminals. The standard percussion welding device includes a retracted movable electrode carrying the wire electrically connected to a charged capacitor, and a fixed electrode carrying a terminal also electrically connected to the capacitor. When a weld is to be effected, the movable electrode is forceably accelerated toward the fixed electrode. An arc is drawn between the wire and the terminal as the wire approaches the terminal causing the end of the wire and area of the terminal across which the arc is drawn to become molten. The end of the wire percussively engages the terminal as both are molten fusing the wire and terminal into a weld.

Heretofore, the velocity and the shape of the tip end of the wire have been critical. If the tip is too thin it will burn back as the arc is drawn and the wire and terminal may become hard before the percussive engagement of the wire and terminal is effected. Conversely, if the tip end of the wire is too blunt the wire and terminal may not become molten before the percussive engagement is effected. In either case, a weld may not occur or the weld may be faulty. Also in welding through insulation with standard percussion welding devices the velocity of the wire changes during the passage through the insulation and unsatisfactory welds result.

It is therefore an object of this invention to provide a new and improved percussion welder for percussively welding an electrically conductive wire to a terminal.

Another object of this invention is to provide a new and improved percussion welder with a controlled velocity.

Still another object of this invention is to provide a new and improved percussion welder wherein the shape of the wire tip is not critical.

It is a further object of this invention to provide a new and improved percussion welder capable of performing an improved weld between an insulated terminal and a wire.

Briefly then, in accordance with the principles of this invention, a welding tool illustrating the features of this invention for welding wires to terminals includes a movable electrode mounted on a support for gripping and moving a pointed wire axially in a predetermined direction with the pointed end thereof in advance of the electrode. The movable electrode is connected to a capacitor to electrically connect the wire to a source of welding voltage. A fixed electrode also connected to the capacitor is adapted to engage the terminal adjacent to a selected portion thereof to electrically connect the terminal to the source of welding voltage and to position the selected portion of the terminal in the path of the pointed end of the wire. After the capacitor is charged, the movable electrode is moved with the wire protruding therefrom toward the terminal and such movement is continued until the terminal and the wire are at a distance sufficient to draw an arc. An electromagnet also connected to the capacitor is energized by the closing of the circuit as the arc is drawn. The electromagnet when energized is adapted to move the pointed end of the wire into percussive engagement with the terminal and cause a weld between the wire and the terminal.

Such a percussive welder does not require a critical velocity nor a critically shaped tip. A weld may also be effected through insulation.

The foregoing and other objects, features and advantages of the invention will be apparent from the following more particular description of a preferred embodiment of the invention, as illustrated in the accompanying drawing.

Figures 1, 2:
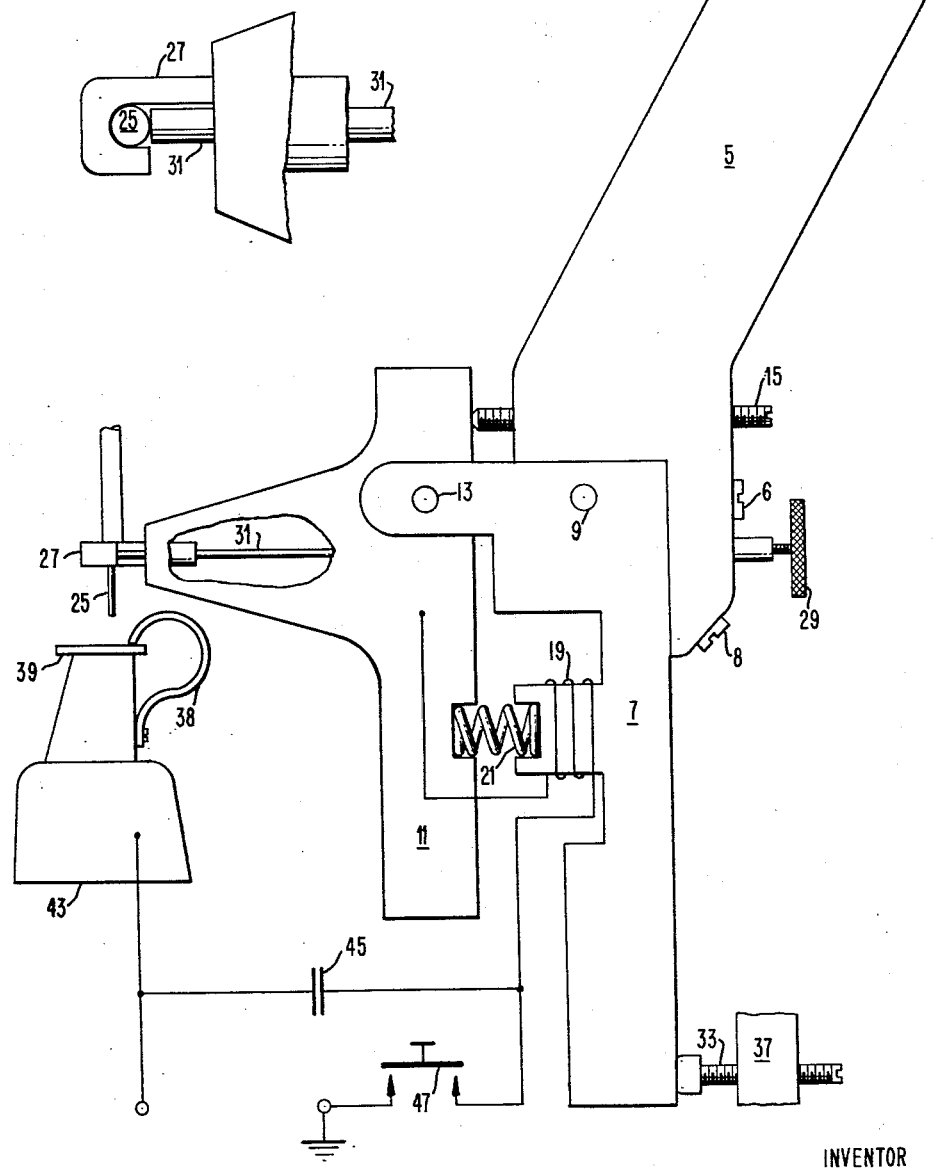
FIG. 1 is a side view of a percussion welder with a schematic of the necessary electrical circuitry constructed in accordance with the principles of this invention.
FIG. 2 is a bottom view of the wire lock shown in FIG. 1.

Reference should now be made to FIGURE 1 for a description of the structure and electrical circuitry associated therewith of a percussion welder constructed in accordance with the principles of this invention. The operation of the percussion welder will be described later in the specification. FIGURE 1 shows a view of the structure in the down position wherein the distance between the terminal and wire is sufficient to draw an arc between the terminal and wire. Handle 5 is secured to yoke 7 by screws 6 and 8 to make one integral unit which may be pivoted as a single unit about pin 9 secured to a fixed frame (not shown). Yoke 7 of an electrically conductive material is an electromagnet with one end of winding 19 connected to armature 11 and the other end to capacitor 45. Armature 11 is pivotally mounted on pin 13 secured to yoke 7. Spring 21 biases armature 11 from yoke 7. Yoke 7 when energized as an electromagnet attracts armature 11 causing the armature to pivot in a counterclockwise direction. Adjustable screw 15 may be adjusted to change the distance between the armature and yoke, thus controlling the distance that the armature travels after attraction by the electromagnet.

Wire lock 27 integral with armature 11 is adapted to hold the non-insulated end of the wire 25. Adjustable wire lock screw 29 is secured to a flexible shaft 31 and by turning the wire lock screw the shaft may be moved in or out to lock or release the wire 25. Referring now to FIGURE 2 for an enlarged bottom view of the wire lock, wire 25 is locked in the hooked end of the wire lock by shaft 31. Wire 25 may be removed from the wire lock by releasing the shaft 31.

Anvil 43 of an electrically conductive hard material is secured to a fixed frame. Terminal 39 is secured thereto by clamp 38 to make electrical contact to the anvil.

Armature 11 is electrically connected through winding 19 to capacitor 45. Wire 25 when locked in position makes electrical contact with armature 11. Anvil 43 is also electrically connected to capacitor 45. Capacitor 45 is connected through switch 47 to a power source. The capacitor is charged when the switch is switched on and remains charged when the switch is switched off.

It has been pointed out that yoke 7 and handle 5 are secured together and armature 11 is pivotally mounted on yoke 9. Thus the whole unit consisting of armature 11, yoke 7 and handle 5 pivots in a clockwise direction, about pin 9, when handle 5 is pulled back and pivoted in a counterclockwise direction, about pin 9, when handle 5 is pushed forward. In FIGURE 1, the handle has been pushed forward until the distance between terminal 39 and wire 25 is sufficient to draw an arc between the wire and the terminal. The force exerted by pushing handle 5 forward, pivoting the unit about pin 9, does not exert any welding force as yoke 7 is stopped when it abuts against adjustable screw 33. Adjustable screw 33 is adjustable with respect to fixed frame 37 to stop the unit consisting of armature 11, yoke 7 and handle 5, and thus determine the distance between terminal 39 and wire 25 after the movement of such unit has been stopped. Adjustable screw 33 is adjusted so that after movement of the unit has been stopped the distance between wire 25 and terminal 39 is just sufficient to draw an arc across such distance. If the force resulting from the movement of the unit brought the wire into engagement with the terminal, thin wires would buckle and the proper force would not be exerted to effect a good weld.

The length of the non-insulated wire extending from the wire lock 27 must be uniform so that after the yoke is stopped by adjustable screw 33, the distance between the end of the wire and the terminal is sufficient to draw an arc. Such uniform length may be maintained by stripping the same length of insulation from each wire and placing the wire into the wire lock until the shoulder of the insulation abuts against the top of the wire lock.

The operation of the percussion welder will next be described. Handle 5 is first pulled back pivoting the unit consisting of armature 11, yoke 7 and handle 5 in a clockwise direction removing the wire lock from the immediate vicinity of the anvil. The wire and terminal to be welded together are selected, the terminal secured to the anvil, the insulation stripped from the wire, and the wire inserted in wire lock 23. Switch 47 is closed to charge capacitor 45 and then reopened. Handle 5 is then pushed forward pivoting the unit consisting of armature 11, yoke 7 and handle 5 about pin 9 in a counterclockwise direction until yoke 7 abuts against adjustable screw 33. The adjustable screw 33 has been adjusted as described before so that after the yoke 7 abuts against adjustable screw 33, the distance between wire 25 and terminal 39 is sufficient to draw an arc. The drawing of the arc causes the end of the wire and the specific area of the terminal across which the arc is drawn to become molten. The completion of the circuit by the drawing of the arc causes current to flow in winding 19, yoke 7 to be energized as an electromagnet, and armature 11 to be attracted to the yoke. Armature 11 pivots on pin 13 in a counterclockwise direction and imparts force to the end of wire 25 bringing the molten end of the wire into percussive engagement with the molten area of the terminal across which the arc is drawn. A weld between the terminal and the wire is thus effected.

After the weld has been effected the terminal and wire are removed together by releasing the wire and the terminal and removing them from the percussion welder.

Handle 5 is then pulled back pivoting the unit consisting of the armature 11, yoke 7 and handle 5 in a clockwise direction and the procedure may be repeated to effect another weld between a terminal and a wire in the same manner as that described.

A percussion welder constructed as described in accordance with the principles of this invention may be used to weld a wire to an insulated terminal. Referring again to FIGURE 1, assume that terminal 39 is an insulated terminal. The welder is first adjusted for welding through insulation in the following manner to allow for the thickness and insulation characteristics of the insulation. The handle is pulled back in the manner before described, a sample terminal is secured to anvil 43 and a sample wire inserted in wire lock 27. Adjustable screw 33 is screwed all the way back to the frame 37 prior to adjustment. Handle 5 is pushed forward pivoting the unit about pin 9 and moving wire 25 toward terminal 39. The wire is forced into the insulation to the point where the distance between the wire and terminal is such that an arc is drawn. It should be noted how far the yoke is from the frame at this point and the adjustable screw 33 adjusted so that yoke 7 abuts against adjustable screw 33. Normal welding operations may then begin. The wire and terminal are removed, the handle is pulled back, and a new wire and terminal are inserted. Handle 5 is pushed forward forcing wire 25 into the insulation until yoke 7 abuts against adjustable screw 33. An arc is drawn between wire 25 and terminal 39, energizing the electromagnet, bringing armature 11 toward yoke 7, bringing wire 25 into percussive engagement with terminal 39. In the case of welding through insulation the force exerted by the handle is important in bringing the terminal 39 and wire 25 close enough together to draw an arc through the insulation.

A new and improved percussive welder for welding a wire to a terminal, constructed in accordance with the principles of this invention, has been described. Such a percussive welder includes a source of welding voltage with fixed and movable electrodes connected thereto. The movable electrode grips a wire and is movable in a predetermined path. The fixed electrode positions the terminal in the path of the wire. The wire is moved toward the terminal until an arc is drawn between the wire and terminal.

An electromagnet connecting the source of welding voltage is energized when the circuit is completed by the drawing of the arc and is adapted to move the wire into percussive engagement with the terminal to effect a weld.

The force bringing the wire into percussive engagement with the terminal is only activated after the arc is drawn so there is no critical velocity adjustment. The percussive engagement is immediate so the wire tip shape is not critical. Welding may also be accomplished through insulation by forcing the wire through the insulation until an arc is struck, and then bringing the wire into percussive engagement with the terminal. The welding force therefore does not vary.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for percussively welding a wire to a terminal comprising
   a source of welding voltage,
   a movable electrode connected to said source of welding voltage adapted for gripping said wire with the end portion thereof projecting in advance of said electrode and for electrically connecting said wire to said source of welding voltage,
   supporting means for constraining said movable electrode and said wire thereon to move along a predetermined path from a retracted position,
   a fixed electrode connected to said source of welding voltage adapted for positioning said terminal in the path of movement of said wire and for electrically connecting said terminal to the source of said welding voltage,
   means for moving said movable electrode and said wire from said retracted position in the direction of said fixed electrode and therewith allowing current from said source to form an arc across said wire and terminal at some point in the advance of said movable electrode along its predetermined path,
   and means responsive to the flow of arc current from said source through said terminal and said wire for further advancing said movable electrode toward said terminal and therewith bringing said wire into percussive engagement with said terminal.

2. Apparatus for percussively welding a wire to a terminal, comprising
   a source of limited electrical energy comprising a capacitor
   means for electrically charging said capacitor
   movable means adapted for gripping said wire with the end portion thereof projecting in advance of said movable means,
   supporting means for constraining said movable means and said wire thereon to move along a predetermined path from a retracted position, fixed means adapted for positioning said terminal in the path of movement of said wire, circuit means for electrically connecting said wire and said terminal across said capacitor means for advancing said movable means and said wire from said retracted position in the direction of said fixed means and therewith allowing current from said capacitor to form an arc across said wire and terminal at some point along the path of travel of said movable means, and means comprising an electromagnet having a winding connected in series with said capacitor, said terminal and said wire operative in response to the flow of arc current through said wire and said terminal for further advancing said movable means and therewith advancing said wire into percussive engagement with said terminal.

3. Apparatus for percussively welding a wire to a terminal including a source of limited electrical energy comprising a capacitor, means for electrically charging said capacitor, a movable electrode having means for grasping said wire with an end thereof projecting from said electrode, a fixed electrode electrically connected to and adapted for positioning said terminal in space, support means including a yoke for constraining said movable electrode to move with respect to said fixed electrode from a retracted position along a particular path extending in the direction in which said wire projects from said movable electrode, said terminal being oriented by said fixed electrode to lie in the path followed by said wire upon the movement of said movable electrode, circuit means for electrically connecting said movable electrode and said fixed electrode across said capacitor, means for advancing said yoke, said movable electrode and said wire from retracted position in the direction of said fixed electrode in order to allow current from said capacitor to form an arc across said wire and said terminal at some point along the path of travel of said movable electrode, stop means for arresting the movement of said yoke at a point in the path of travel reached after the flow of current is established between said terminal and said wire, said support means including an armature mechanically interposed between said movable electrode and said yoke, said armature being movable for advancing the end of said wire borne by said movable electrode into engagement with said terminal, and means comprising an electro-magnet having a winding connected in series with said capacitor, said terminal, and said wire operative in response to the flow of arc current through said wire and said terminal for moving said armature with respect to said yoke and therewith advancing said wire into percussive engagement with said terminal.

References Cited in the file of this patent

UNITED STATES PATENTS

| | | |
|---|---|---|
| 1,734,716 | Daniel | Nov. 5, 1929 |
| 2,785,283 | Summer | Mar. 12, 1957 |